US006633163B2

United States Patent
Fling

(10) Patent No.: US 6,633,163 B2
(45) Date of Patent: Oct. 14, 2003

(54) APPARATUS AND METHOD FOR DETECTING AN UNDERGROUND CABLE WHILE OPERATING A PIECE OF MACHINERY

(75) Inventor: Richard William Fling, Bristol (GB)

(73) Assignee: Radiodetection Limited, Bristol (GB)

( * ) Notice: Subject to any disclaimer, the term of this patent is extended or adjusted under 35 U.S.C. 154(b) by 0 days.

(21) Appl. No.: 09/931,994

(22) Filed: Aug. 17, 2001

(65) Prior Publication Data

US 2002/0047709 A1 Apr. 25, 2002

Related U.S. Application Data

(63) Continuation-in-part of application No. 09/300,488, filed on Apr. 28, 1999, now abandoned.

(51) Int. Cl.$^7$ .............................. G01V 3/08; G01V 3/11
(52) U.S. Cl. ......................................... 324/326; 324/67
(58) Field of Search ...................... 324/67, 326–329, 324/242, 243, 207.26, 207.15, 247; 37/906

(56) References Cited

U.S. PATENT DOCUMENTS

| 4,387,340 A | * | 6/1983 | Peterman | 324/326 |
|---|---|---|---|---|
| 4,427,942 A | * | 1/1984 | Sole | 324/326 |
| 4,540,942 A | * | 9/1985 | Yamamura et al. | 324/127 |
| 4,672,321 A | * | 6/1987 | Howell | 324/326 |
| 4,806,869 A | * | 2/1989 | Chau et al. | 175/45 |
| 5,065,098 A | * | 11/1991 | Salsman et al. | 324/326 |
| 5,093,622 A | * | 3/1992 | Balkman | 324/326 |
| 5,471,143 A | * | 11/1995 | Doany | 324/233 |
| 5,592,092 A | * | 1/1997 | Mechler | 324/326 |
| 6,130,539 A | * | 10/2000 | Polak | 324/326 |

\* cited by examiner

*Primary Examiner*—Jay Patidar
(74) *Attorney, Agent, or Firm*—Baker & Hostetler LLP

(57) ABSTRACT

An excavator vehicle has sensors thereon at different heights. Each sensor may have a coil which is generally horizontal and which detects the magnetic field generated by a current in a buried conductor. By detecting the relative magnitudes of the component of the field parallel to the ground, as detected by the sensors, it is possible to determine whether or not the excavator vehicle is proximate the buried conductor. A warning may be generated, or the excavating tool of the excavator vehicle controlled, to prevent the excavating tool damaging the buried conductor.

14 Claims, 4 Drawing Sheets

APPARATUS AND METHOD FOR DETECTING AN UNDERGROUND CABLE WHILE OPERATING A PIECE OF MACHINERY

CROSS REFERENCE TO RELATED APPLICATIONS

This application is a Continuation-in-Part of U.S. application Ser. No. 09/300,488 filed Apr. 28, 1999, now abandoned and entitled "Excavator Vehicle With Underground Conductor Detectors" by Richard W. Fling, the entire contents and substance of which are hereby incorporated in total by reference.

BACKGROUND OF THE INVENTION

1. Field of the Invention

The present invention relates to a system for detecting an underground object such as a cable or pipe, using a detector mounted on a construction vehicle such as an excavator vehicle.

2. Summary of the Prior Art

The proliferation of networks of buried cables and pipes from many different utilities (electricity, gas, telecommunications etc) has meant that an excavation of the ground is likely to be in the vicinity of a buried cable or pipe, and such excavation involves a risk of damage or interference to the buried cable or pipe. This problem is particularly acute when the excavation is carried out by a powered excavating tool such as a back hoe mounted on an excavator vehicle. Because of the separation of the operator of the excavator vehicle from the point of excavation, it is very easy for the excavating tool to make contact with the buried cable or pipe, particularly when the exact location of the buried cable or pipe has not been accurately established and marked in a way which is readily visible to the operator of the excavator vehicle. Moreover, the power of excavating tools is large, so that any contact between the excavating tool and the buried cable or pipe is likely to result in damage to that buried cable or pipe.

It is known to mount a detector on the excavating tool itself, to detect currents in the underground conductor and to generate an alarm or to prevent movement of the excavating tool in a way that would cause the excavating tool to approach too closely to the underground conductor.

SUMMARY OF THE INVENTION

The present invention, on the other hand, proposes that sensors be mounted at different heights on the excavator (construction)vehicle itself, with each sensor having at least one magnetic field detector for detecting a component of magnetic field which component is generally parallel to the ground on which the construction vehicle stands or moves. The sensors detect the magnetic fields generated by currents in the underground conductor.

In such an arrangement, when the excavator vehicle is relatively remote from the underground conductor, the or each upper sensor detects a larger signal than the or each lower sensor, because of the difference in angle of alignment of the field, and thus the difference in the components parallel to the ground. However, as the vehicle approaches the underground conductor, that effect decreases, but the effect of difference in separation between the underground conductor and each sensor increases. Once the sensors are directly above the underground conductor, the lower sensor detects a larger field.

Thus, there is a zone on either side of the underground conductor in which the lower sensor detects a larger field, with the upper sensor detecting a larger field beyond that region. The cross-over points between these two regions may thus be used to trigger an alarm. This means that a detection zone is formed between the cross-over points. The operator of the vehicle may be presented with an alarm when the vehicle such that an underground conductor enters into that detection zone. Most excavator vehicles drag the excavating tool behind them, the excavator tool can be prevented from coming into proximity with the underground conductor. It should be noted that this effect of upper and lower sensors is known per se from U.S. Pat. No. 4,427,942. The exact positioning of the sensors on the vehicle is not critical, and indeed it is possible for them to have a small displacement in the horizontal direction, relative to each other.

As mentioned above, the construction vehicle incorporating the present invention is preferably an excavator vehicle, since the present invention finds particular applicability in preventing the excavator tool of such a vehicle of coming in to proximity with an underground conductor. However, the present invention may be applicable to other types of construction vehicle, such as a heavy vehicle which could cause damage to the conductor if it were to drive over it. Moreover, since the present invention creates a detection zone, it is also possible to operate the vehicle so that it remains in the detection zone, i.e. it permits the vehicle to follow the path of the conductor and to generate a warning to the operator if the vehicle departs from the path of conductor, and the detection zone no longer encompasses the conductor.

The sensors may provide outputs to a processing apparatus which is frequency selective, so that it is possible to detect the presence of conductors carrying mains power, and/or conductors to which a signal has been supplied at one or more known frequencies.

The magnetic field detector or detectors of each sensor may each be in the form of a single coil with a axis which is generally parallel to the ground on which the vehicle stands or moves, the axes of the coils being generally parallel. However is also possible for each upper and lower sensor to have orthogonal, horizontal, pairs of coils, so that the horizontal orientation of the conductor relative to the sensors (assuming the ground is generally horizontal) does not affect measurements. A further possibility is for the magnetic field detector or detectors to be in the form of magnetometers, which again may be provided as a single magnetometer for each sensor, or plural magnetometers. Furthermore, since the aim of the sensors is to detect the component of the magnetic field which is parallel to the ground, arrangements of coils and magnetometers may be provided in which the coils and magnetometers themselves are not parallel to the ground, but which are arranged to detect the appropriate component of the field. For example, two coils inclined in opposite directions at approximately 45 degrees to the plane parallel to the ground can be used to determine the component parallel to the ground by algebraic processing of their outputs.

Furthermore, although the present invention has been described as applicable primarily to a vehicle moving on land, this again is not essential and the vehicle may be e.g. a submarine following an under water cable, or a cable buried in the floor of the sea.

BRIEF DESCRIPTION OF THE DRAWINGS

An embodiment of the present invention will now be described in detail, by way of example, with reference to the accompanying drawings, in which.

DETAILED DESCRIPTION

Embodiments of the present invention will now be described in detail. In the discussion of the embodiments, it will be assumed that the vehicle embodying the present invention stands or moves on flat ground, so that the component of the magnetic field which the sensors are arranged to detect is horizontal. However, it should be noted that references to "horizontal" in the subsequent description are not limiting, and the component of the field detector will not be horizontal if the ground on which the vehicle moves is not, itself, horizontal.

Figure 1:
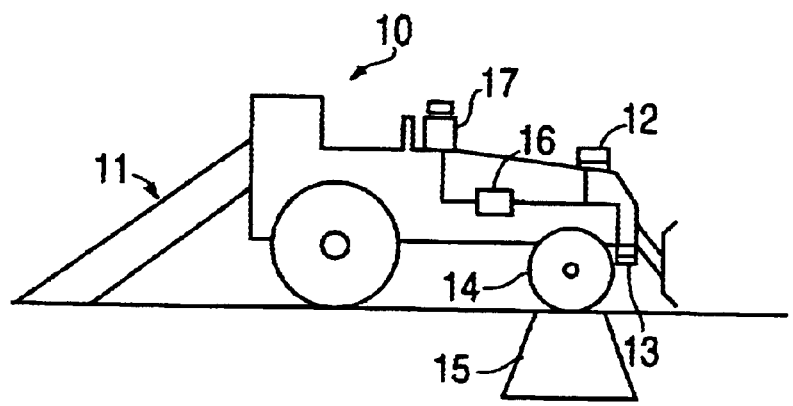
FIG. 1 is a schematic view of an excavator vehicle embodying the present invention.

Referring first to FIG. 1, an excavator vehicle 10 has an excavating blade 11 at the back thereof which is used to excavate a trench in the ground, and may therefore strike an underground conductor such as a buried cable or pipe, if the excavating blade 11 comes into contact with that underground conductor. To prevent this, the excavator vehicle has upper and lower sensors 12,13 mounted thereon proximate the front wheels 14, which are used to define a protection zone 15 for the vehicle 10. If the vehicle 10 moves so that an underground conductor comes within the zone 15, this condition is detected by a processor 16 which monitors the outputting of the sensors 12, 13 and triggers an alarm 17 to the operator of the vehicle. The operator may then stop the action of the excavating blade 11, and this occurs well before the excavating blade approaches the underground conductor. Alternatively, the alarm may be connected to the drive to the vehicle or excavating vehicle to stop the movement thereby when the alarm is triggered.

Figure 2:
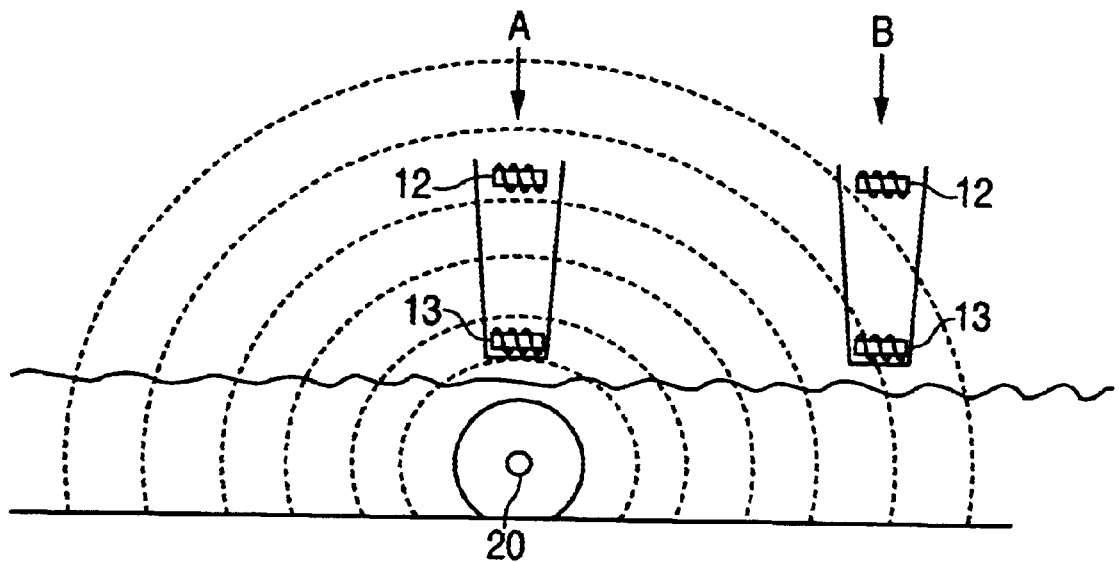
FIG. 2 shows the relationship between the sensors of the vehicle in FIG. 1 and the magnetic field generated by an underground conductor.

In the simplest arrangement, the sensors 12,13 each comprise a horizontal coil which is generally horizontal, and which is aligned with the front-to-back axis of the vehicle 10. FIG. 2 shows how the sensors 12,13 then intercept the field generated by alternating currents carried by an underground cable 20. When the sensors 12,13 are directly over the cable 20, in the position shown by arrow A, the field is substantially parallel to the sensors 12,13 so that they each detect substantially the whole of the field. However, since the lower sensor 13 is closer to the cable 20 than the upper sensor 12, their outputs will be different, with the lower sensor 13 having a greater output. When the sensors 12,13 are relatively far from the cable 20, as shown by arrow B in FIG. 2, the angles made by the sensors 12,13 relative to the field are different, and the horizontal component in the field detected by the lower sensor 13 is smaller than the horizontal component detected by the upper sensor 12. Thus, at this point, the upper sensor 12 will produce a greater output.

Figure 3:
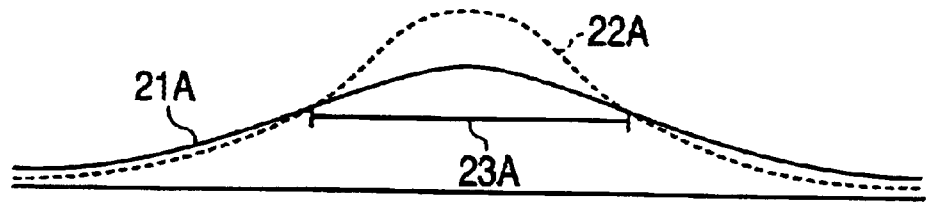
FIG. 3 shows the signals detected by the sensors in FIG. 2.

The effect of this is shown in FIG. 3, with the solid line 21A representing the output from the upper sensor 12, and the dotted line 22A representing the output from the lower sensor 13. It can be seen that there is a region 23A within which the output of the lower sensor is greater than that of the upper, and this region 23A can thus be used to define the boundaries of the zone 15. The relative outputs of the sensors 12,13 are detected by a processor 16.

It can be noted that this use of upper and lower sensors is particularly valuable in that it tends to cancel out remote interference, since that will be detected substantially equally by the sensors 12,13. Moreover, although the above description has assumed that each sensor 12,13 has only a single coil, an arrangement using orthogonal, but generally horizontal, coils enables an underground conductor to be detected in a way which is independent of the orientation of the conductor to the front-to-back axis of the vehicle 10.

Within the application environment of the excavator vehicle, the purpose of the operation is generally to trench a long length of utility cable or other conduit into the ground. The trenching operation is usually carried out from one construction or contractually defined starting location to a finishing location, possibly passing through a number of other locations, for spurs to be added, as a separate operation. Given the size and construction of the excavator vehicle, it is usual to trench in generally straight lines with large radius turns. It is normal for the path of the trench to be planned to pass away from other buried utility lines so that the possibility of damaging them is minimised. However industry experience demonstrates that increasingly there are situations where this is not possible and a trench is required to be put in proximity to other buried utilities. There are also occasions where there are unmarked utilities crossing or within the vicinity of the path of the trench.

When the machine is within the proximity of other buried utility lines the operator normally relies on other organisations, to expose or otherwise mark the position of these lines on the surface (possibly using an electromagnetic cable locator). The operator of the excavator vehicle has no independent means to confirm that the path is in fact free of any buried lines. Additionally there is no reason why the path of these existing buried lines will be in any particular orientation with respect to the path of the trencher, crossing at any angle, or running nominally parallel. These operational practices still have a risk of marking error and there are numerous examples of errors in this process resulting in the excavation vehicle hitting a buried line.

The principal purpose of the orthogonal array is to ensure that the detection process will operate with a buried line, in any generally horizontal orientation, relative to the path of the excavation vehicle.

The sensors 12, 13 may be made to detect magnetic fields only at selected frequencies, and it is then possible to detect only certain types of underground conductors. For example, the arrangement may be made sensitive to cables carrying mains power. Alternatively, they may be made sensitive to currents of specific frequencies applied to underground conductors. Different types, and physical structures, of the various types of buried utilities have different susceptibility, or probability, of carrying a detectable current at any particular frequency.

To maximise the probability of detection the frequencies of all likely current sources are monitored, the choice of these frequencies is based on the industry working practices of a major buried utility industries and operating characteristics of permanently installed equipment. These frequencies include currents which passively couple to the lines, like power ground current signals at 50 or 60 Hz, VLF radio transmission signals in the band 15 to 25 KHz and CCTV power supply signals at 31.5 KHz. Other systems hare applied signals for the purpose of EN location or cathodic protection for pipes. The location signals include all the operating frequencies used by the major cable locator manufacturers and 100 or 120 Hz, which is the AC current component of the full-wave rectified DC current used by most cathodic protection systems.

The principal purpose of simultaneously detecting multiple frequencies is to maximise the probability of independent detection of multiple utility lines each carrying currents of differing amounts and at different frequencies.

Figure 4:
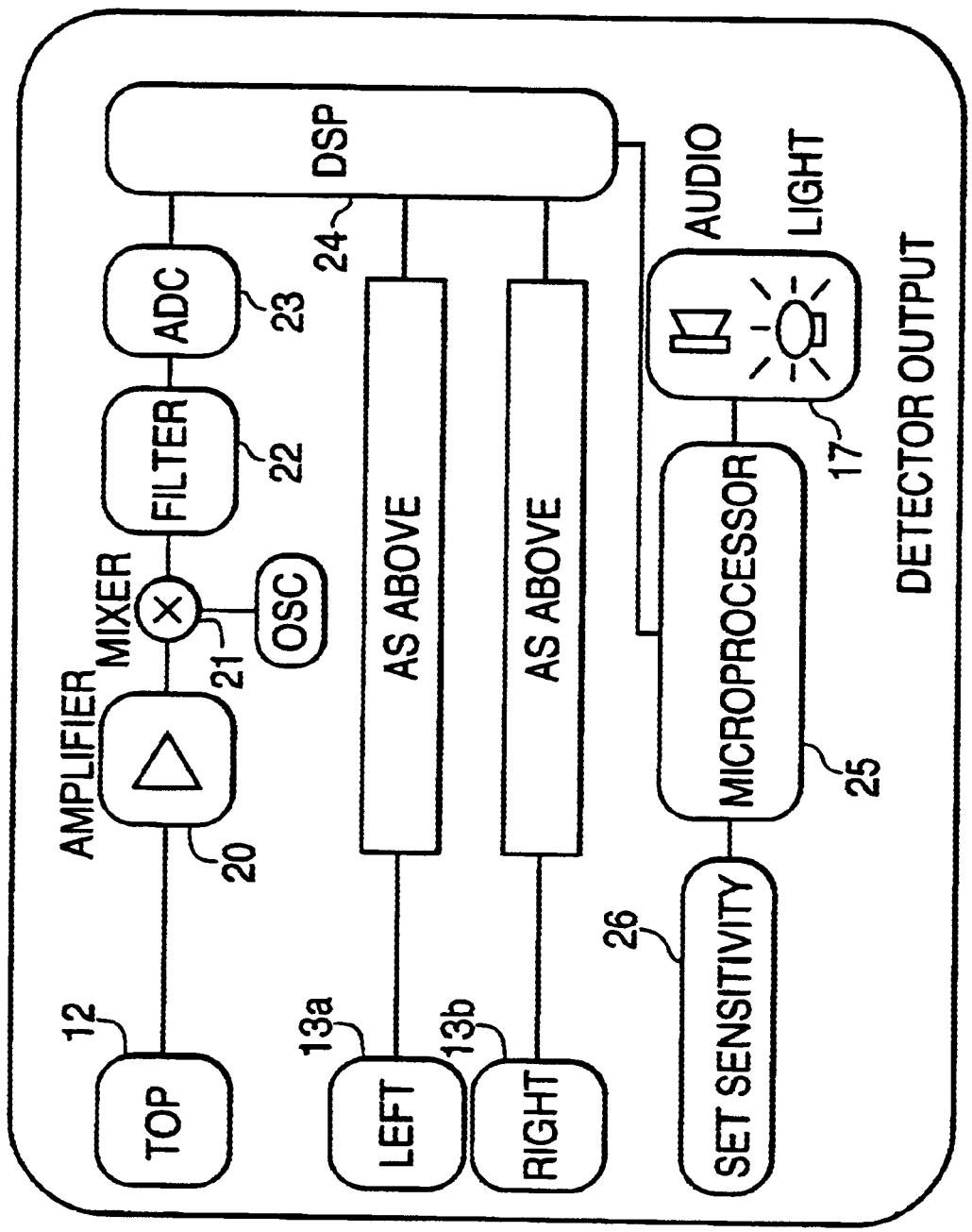
FIG. 4 is a schematic block diagram of the signal processing arrangement for the embodiment of FIG. 1.

FIG. 4 shows the processor 16 in more detail. It also shows a further modification of the embodiment of FIG. 1, in that there are two lower sensors one 13a to the left of vehicle and one 13b to the right. The output of each sensor 12, 13a, 13b is amplified by an amplifier stage 20, mixed 21 with an oscillator signal, and passed through a filter 22 to an analog-to digital converter (ADC) 23. The signals are then passed via a digital signal processor (DSP) 24 to a microprocessor 25. The DSP provides a frequency spectrum. An input 26 to the microprocessor 25 enables the sensitivity of the apparatus to be adjusted if desired. The output of the microprocessor triggers the alarm 17. The alarm 17 may be any device which generates an indicator to the operator. For example, it may provide an audible or visible display. An alarm may also be considered to be given when a moving pointer passes a pre-determined point on the display Normally, the alarm will be arranged to be triggered when the vehicle 10 approaches closely with the underground conductor. However, it is also possible to operate embodiments of the present invention to arrange for the vehicle to follow the line of underground conductor so that the alarm is triggered when the conductor is no longer within the zone 15.

The adjustment of sensitivity may be needed in order to adjust to take into account flux distortion due to the materials of the vehicle 10 on which the apparatus is mounted. Alternatively, it may be desirable to reduce the width of the detection zone so that the system can operate next to known conductors which would otherwise be detected, such as when running in a cable right of way parallel to existing services. Moreover, the adjustment may be selective for each operating frequency, so that different frequencies may have different sensitivities. This may then trigger different alarm responses for the different frequencies.

Another way of adjusting the sensitivity, either as an alternative to, or in addition to, the action of input 24 is to alter the ratio of the gain of the signal from the upper sensor 12 relative to the lower sensor or sensors 13, 13a, 13b. This may be achieved eg by varying the gain of the corresponding amplifiers 20. If there is a relative increase in the gain of the signal from the upper sensor 12, the width of the protection zone 15 is reduced. Another sensitivity adjustment is to alter the bias sensitivity of the signal paths from each sensor 12, 13, 13a, 13b to raise the detection threshold to reduce noise interference.

If the size of the zone 15 is adjusted, this enables the arrangement to be tuned so that the vehicle 10 can run generally parallel to an existing cable, but maintaining uniform spacing therefrom. If the position of the vehicle 10 is adjusted to that the cable is just outside the detection zone 15, the alarm 17 will trigger if the underground conductor moves within the detection zone 15 as the vehicle 10 moves. If the vehicle is then moved so as to maintain the underground conductor just outside zone 15, the line of the trench dug by the trenching blade will be parallel to the underground conductor.

To modify the arrangement of FIG. 4 to detect multiple frequencies, the oscillator and mixer (21) divides the range of frequencies into a number of discrete frequency bands. Signals within a common base band frequency range, chosen to be within the operating frequency range of the ADC, are digitised by the ADC (item 23) and then digitally processed. For convenience the base band signal bandwidth is in the frequency range 30 Hz to 10 kHz.

Figure 5:
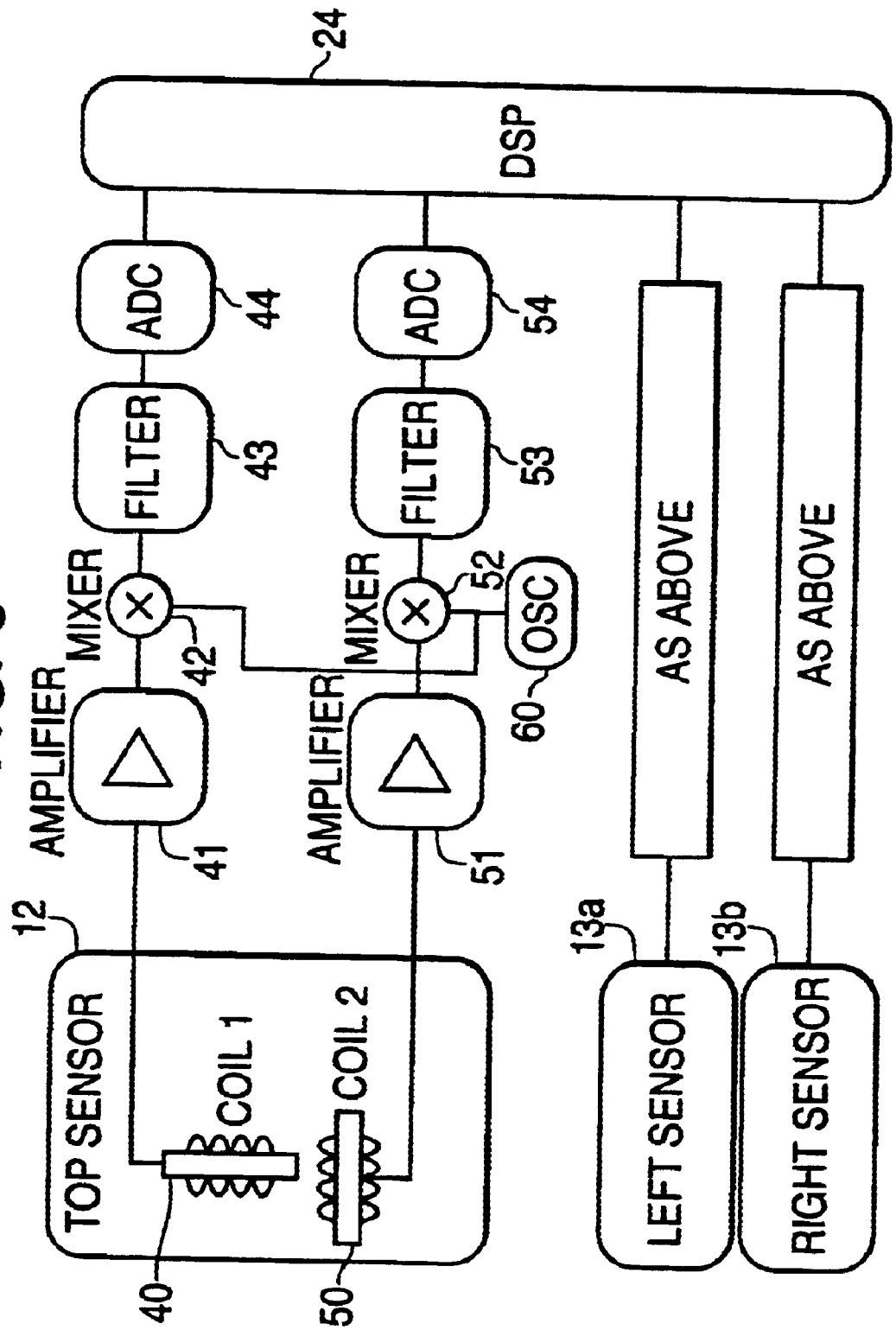
FIG. 5 is a schematic block diagram of a signal processing arrangement for an embodiment incorporating orthogonal aerials.

FIG. 5 illustrates in more detail that the modified schematic block diagram of the signal processing arrangement for orthogonal aerials. In FIG. 5, each of the top, left and right sensors 12, 13a and 13b has two coils forming a horizontal orthogonal coil array. For the sake of simplicity, those two coils 40, 50 are shown for the top sensor 12, but not for the other two sensors 13a, 13b. Each coil 40, 50 is connected to an amplifier 41, 51 similar to the amplifier 20 in FIG. 4, and via a respective mixer 42, 52 to filters 43, 53 and ADCs 44, 54. The mixers 42, 52 are connected to an oscillator 60 in the same way as the mixer 21 in FIG. 4. The filters 43, 53 and the ADCs 44, 54 may be similar to the filter 22 and the ADC 23 in FIG. 4. The outputs of the ADCs 44, 54 then pass to the DSP 24. The signal path from the left and right sensors 13a, 13b are then the same as from the top sensor 12, in having two paths each, but these are omitted from FIG. 5 for clarity. Note that the processing arrangement of FIG. 5 may also have a sensitivity input, a microprocessor, and the detector outputs shown in FIG. 4, but again these are omitted for clarity.

The function of the DSP 24 is, for each coil, to detect the magnitudes of the signals at a plurality of predetermined frequencies, those frequencies covering the full dynamic signal range of the system. The oscillator and mixers 42, 52 divide the range of frequencies into a number of discrete frequency bands. Signals within a common base band frequency range, chosen to be within the operating frequency range of the ADCs 44, 54 are digitised by the ADC and then processed digitally. For convenience, the base band signal band is in the frequency range 30 Hz to 10 kHz.

To ensure that a substantially horizontal magnetic field of any orientation is detected, the outputs of the two orthogonal horizontal coils are independently processed and then combined e.g. by vector summing or in some other way. The horizontal field can then be calculated from the equation $$\text{horizontal field} = \text{constant} \times \sqrt{((\text{coil } 1)^2 + (\text{coil } 2)^2)}$$

where coil 1 and coil 2 are the outputs from the two coils 40, 50, or the corresponding coils in the left and right sensors 13a and 13b.

Figure 6:
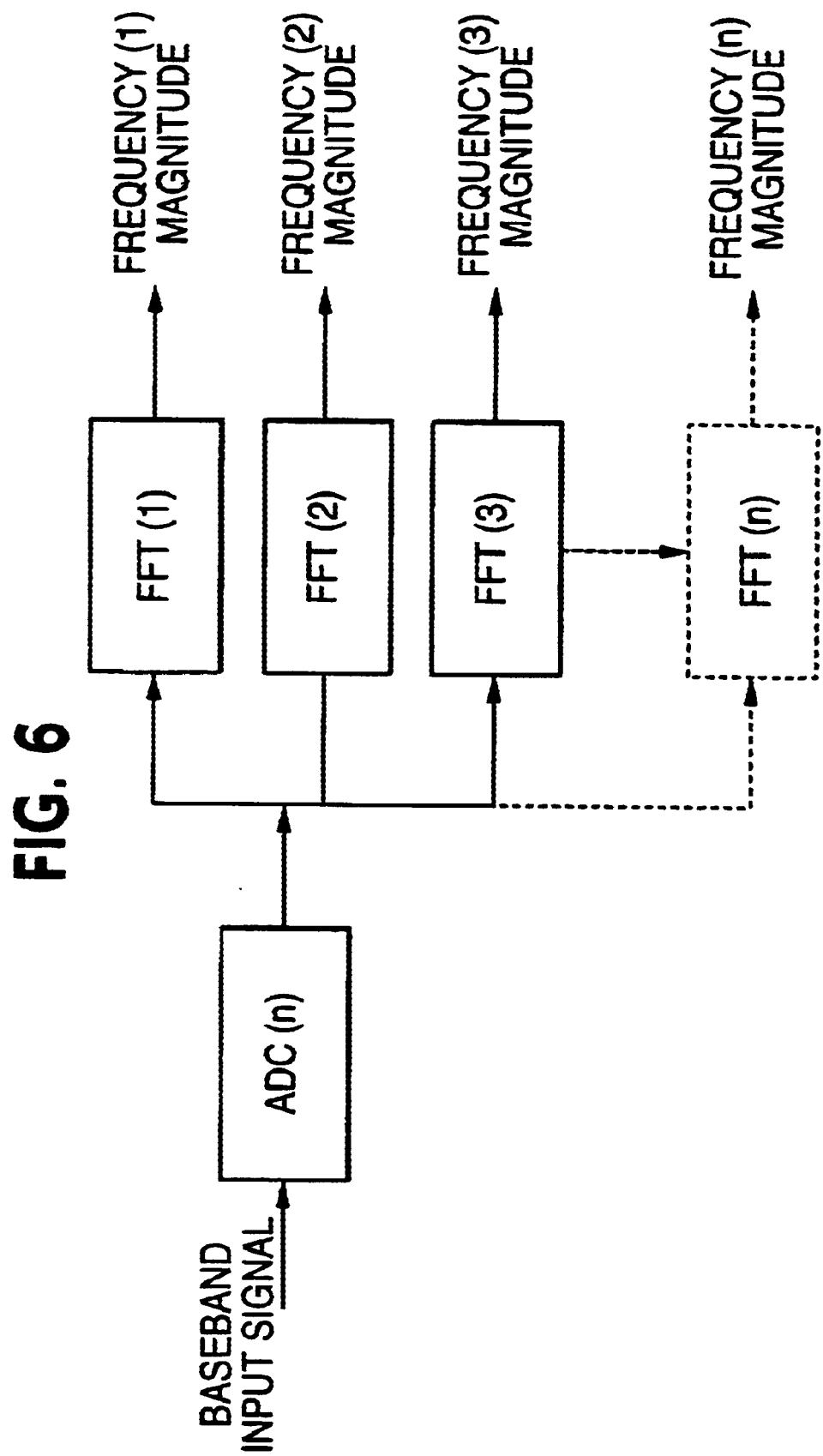
FIG. 6 illustrates the transform function used in the embodiment of FIG. 5.

The digital processing consists of performing a number of discrete or fast Fourier transforms (DFT or FFT). Each transform operates at one of the predetermined signal frequencies, offset by the mixing process. The output of the transform process is proportional to the signal strength of a small range of frequencies determined by the transform function. This is illustrated in FIG. 6.

For speed of response, the detection process is carried out in two stages:

Stage 1: Using the functionality of the DSP 24, all frequencies present on the top sensor 12 are monitored, when any of the predetermined frequencies are present, above a detection threshold, then this triggers the second stage.

Stage 2: The bandwidth of the FFT function of the DSP 24 for the detected frequency is reduced, to provide greater frequency discrimination and reduce and background noise, using this narrow band mode the output of each sensor at this frequency is captured and the detection criteria (see FIG. 3) is applied. The detector outputs are triggered if the bottom sensor signals exceed the top.

$$\text{Bottom sensor}(f_n) > \text{Top sensor}(f_n)$$

The sensitivity control is a mechanism by which the detection threshold of any signal frequency, on either left or right sensor side, can be independently adjusted. This is achieved by scaling the output (sensitivity constant). When the sensitivity control levels are adjusted the detection criteria for each frequency, of both of the lower sensors, are independently adjusted such that a set of new thresholds are set, just above the current ratio.

$$\text{Bottom sensor}(f_n) \times \text{Sensitivity constant}(f_n) > \text{Top sensor}(f_n)$$

By this means the system detection thresholds can be altered to accommodate conditions where it is desirable to continue to use the system whilst one or more detected signals are present which meet the minimum detection criteria.

Many modifications to the above embodiment may be carried out by a person skilled in the art within the scope of the present invention. For example, in the embodiment described the sensors 12, 13a, 13b comprise orthogonal coils. They may instead be magnetometers to detect the component of the field parallel to the ground. Furthermore, it is possible to use magnetometers or coils which are not parallel to the ground, in a coil or magnetometer array arranged such that the magentic field component parallel to the ground may be determined.

What is claimed is:

1. A vehicle having forward and rearward portions along a line of forward movement along the surface of the ground, the vehicle comprising:
   means for an excavating along the rearward portion of the vehicle for insertion into the surface;
   upper and lower means for sensing mounted along the forward portion of the vehicle to define a protection zone relative to the vehicle, the upper and lower means for sensing are located forward and at the opposing end from the excavating means and at differing distances from the surface of the ground, the upper and lower means for sensing comprise at least one detector means for detecting a component of a magnetic field generally parallel to the ground produced by an underground conductor;
   means for comparing the magnitude of the magnetic fields detected by the upper and lower and means for sensing to determine the presence of the underground conductor in the protective zone; and
   means for indicating that the underground conductor has been detected in the protective zone.

2. The vehicle according to claim 1, wherein the upper and lower means for sensing comprise a coil with an axis is generally parallel to the surface.

3. The vehicle according to claim 1, wherein the means for comparing has a variable sensitivity.

4. The vehicle according to claim 1, further comprising variable gain amplifiers linked to the upper and lower means for sensing.

5. The vehicle according to claim 1, wherein the upper and lower means for sensing further comprise an adjustor to adjust the detection threshold of each upper and lower means for sensing.

6. The vehicle according to claim 5, wherein the detection threshold of at least one of the upper or lower means for sensing if different from the detection of at least one other of the upper or lower means for sensing.

7. The vehicle according to claim 1, wherein the upper or lower means for sensing are configured such that they are sensitive to magnetic field of a predetermined frequency.

8. The vehicle according to claim 7, wherein at least one of the upper or lower means for sensing is configured to be sensitive to magnetic fields of a first predetermined frequency and at least the other of the upper or lower means for sensing is arranged to be sensitive to magnetic fields of a second predetermined frequency.

9. The vehicle according to claim 1, wherein the upper and lower means for sensing are configured to be sensitive to a magnetic field having a plurality of different frequency bands.

10. The vehicle according to claim 9, wherein the means for comparing is configured to compare the outputs of the upper and lowers means for sensing at different times for each frequency band.

11. The vehicle according to claim 9, wherein the means for comparing is configured to simultaneously compare the outputs of the sensor for at least one frequency band.

12. The vehicle according to claim 1, wherein the upper and lower means for sensing has an adjustor to adjust its detection threshold, and the detection threshold of the upper and lower means for sensing for one of the frequency bands is different from the detection threshold of the upper and lower means for sensing for another of the frequency bands.

13. The vehicle according to claim 1, wherein the upper and lower means for sensing each include a digital signal processor for determining frequency bands.

14. A excavation machine having a forward and rearward portion along a line of forward movement along the surface of a ground, the vehicle comprising:
   an excavator along the rearward portion of the vehicle to be inserted into the ground;
   upper and lower sensors mounted along the forward portion of the excavation machine and at the opposing end of the excavator to define a protection zone, the sensor are positioned at differing distances from the ground, each of the sensors comprising at least one detector to detect a component of a magnetic field generally parallel to the ground generated by a underground conductor;
   a processor linked to the sensors to determine whether the underground cable is located within the protection zone; and
   an indicator connected to the processor that is activated once the underground cable is located within the protection zone.

* * * * *